Feb. 22, 1966     H. SCHILL ET AL     3,237,067
REGENERATIVE CAPACITOR
Filed Nov. 10, 1960
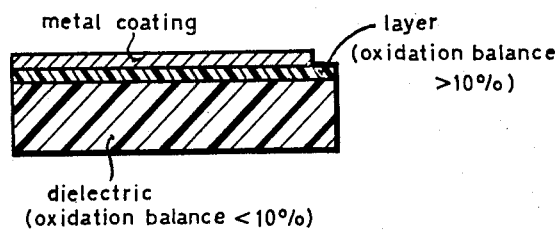

3,237,067
REGENERATIVE CAPACITOR

Hermann Schill and Fritz Gaenge, Munich, Germany, assignors to Siemens & Halske Aktiengesellschaft, Berlin and Munich, a corporation of Germany
Filed Nov. 10, 1960, Ser. No. 68,333
Claims priority, application Germany, Jan. 12, 1960, 66,603
10 Claims. (Cl. 317—259)

This invention is concerned with a regenerative capacitor having a dielectric with normally insufficient regenerative properties, such dielectric being treated so as to impart regenerative properties thereto.

While many dielectric materials are known and are being used in connection with non-regenerative capacitors, only few dielectric materials are employed in connection with regenerative capacitors, for example, paper, cellulose derivatives and polyethyleneterephthalate. The reason resides in the fact that the phenomena occurring in the regeneration process have until now been largely unknown and that no general rules could therefore be given for the construction of such capacitors. Research concerning these phenomena has produced the following findings:

The regenerative properties of capacitors are mainly codetermined by the chemical structure of the dielectric. Of particular importance for the regenerative process are the atoms with strongly oxidizing properties, for example, oxygen and fluorine, which are present in the molecules. A certain amount of an oxidizing agent is required in the regeneration process for the complete conversion of the dielectric to stable oxidation products, for example, $CO_2$ and $H_2O$. The percentage portion of this amount, which is present in the molecule, is referred to as oxidation balance. The oxidation balance of the dielectric layer disposed directly underneath the metal coating is particularly decisive for the satisfactory course of the regenerative process, since the insulation path formed upon breakdown is largely formed by the breakdown (burn-out) area the radius of which is about 100 times greater than the thickness of the metal foil or plate.

It was found that the regeneration process is satisfactory in the case of dielectric materials with an oxidation balance >10 percent, for example, in the case of paper, cellulose acetate, ethylcellulose, polytetrafluorethylene, polyethyleneterephthalate. In case of an oxidation balance <10 percent, for example, in the case of polycarbonate, polystyrol, polyethylene, polyvinylcarbazole, there will occur carbonization which results in lower insulation values and in some cases in short circuiting. Accordingly, these materials cannot be employed for regenerative capacitors despite their good dielectric properties and despite the fact that they are in part highly temperature resistant.

In order to enable the use of materials with good dielectric but poor regenerative properties, for the construction of regenerative capacitors, it is in accordance with the invention and based upon the newly discovered information proposed, to provide such dielectric material on one or on both sides thereof with a thin layer of a material which contains in the molecule at least 10 percent of the oxidation agent required for a complete conversion to the stable oxidation product.

In case the metal coating or plate is to be provided with such a layer on both sides thereof, such coating or plate is completely embedded in or enveloped by layers of a material with an oxidation balance which is greater than 10 percent. Layers with a thickness considerably smaller than 1 micron are satisfactory since only the uppermost molecule layers are decisive which are decomposed incident to the burning out. For example, plates of polycarbonate can be provided with thin layers of ethylcellulose, polyethyleneterephthalate, nitrocellulose or acetobutyrate, while plates of polystyrol can be provided with thin layers of ethylenecellulose, polyethyleneterephthalate or nitrocellulose, and plates of polyethylene or polypropylene can be provided with thin layers of cellulose acetate, ethylcellulose, polyethyleneterephthalate, nitrocelluose or acetobutyrate, thereby imparting good regenerative properties to these dielectric materials which are otherwise unsuitable for regenerative capacitors.

The drawing, which discloses a transverse sectional view illustrating a dielectric sheet having respective layers thereon in accordance with the invention.

As illustrated, the dielectric has an oxidation balance less than 10 percent while the thin layer disposed between the metal coating and the dielectric has an oxidation balance greater than 10 percent.

The measure according to the invention has been found particularly advantageous, for example, in the case of thin foils made of polycarbonate, having a thickness of less than 6 microns, provided on one side thereof with a layer of cellulose acetate, with a thickness of about 1 micron, upon which the aluminum coating is vaporized. In the case of polycarbonate with the structure

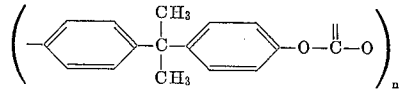

there will be obtained, upon conversion to $H_2O$ and $CO_2$, an oxidation balance of 7.7 percent, thus

| 16 C | 16 $CO_2$ | Requirement | 32 | 0 |
| 14 H | 7 $H_2O$ | Requirement | 7 | 0 |
| | | Total Requirement | 39 | 0 |

$$\text{Oxidation Balance} = \frac{3}{39} = 7.7\%$$

In the case of cellulose acetate, the balance is considerably higher, amounting to aobut 26 percent. The method according to the invention combines the good electrical properties of polycarbonate with the good regenerative properties of cellulose acetate, thereby making it possible to produce thin foil capacitors based upon polycarbonate.

The invention is not inherently limited to the particular combinations noted herein as it supplies a general rule according to which materials having good dielectric properties but being unsuitable for regenerative capacitors can be treated so as to adapt them for the production of such capacitors.

Changes may be made within the scope and spirit of the appended claims which define what is believed to be new and desired to have protected by Letters Patent.

We claim:

1. A regenerative capacitor having a dielectric layer with normally insufficient regenerative properties, said dielectric comprising polycarbonate and being provided at least on one side thereof with a thin layer of cellulose acetate which contains in the molecule at least 10 percent of an oxidation agent required for the complete conversion thereof to stable oxidation products, and a metal coating disposed on said layers.

2. A regenerative capacitor according to claim 1, wherein said polycarbonate dielectric layer has a thickness of less than 6 microns.

3. A regenerative capacitor according to claim 1, wherein said cellulose acetate layer has a thickness of 1 micron or less.

4. A regenerative capacitor according to claim 1, wherein said polycarbonate dielectric layer has a thickness of less than 6 microns, and said cellulose acetate layer has a thickness of 1 micron or less.

5. A regenerative capacitor having a dielectric with normally insufficient regenerative properties, said dielectric being provided at least on one side thereof with a thin layer, having a thickness amounting to 1 micron or less, of a material which contains in the molecule at least 10 percent of an oxidation agent required for the complete conversion thereof to stable oxidation products, and a metal coating disposed on said layer.

6. A regenerative capacitor having a dielectric with normally insufficient regenerative properties, said dielectric having a thickness amounting to less than 6 microns and being provided at least on one isde thereof with a thin layer, having a thickness amounting to 1 micron or less, of a material which contains in the molecule at least 10 percent of an oxidation agent required for the complete conversion thereof to stable oxidation products, and a metal coating disposed on said layer.

7. A regenerative capacitor having a dielectric layer with normally insufficient regenerative properties, said dielectric being formed from a material selected from a class consisting of polycarbonate, polystyrol, polethylene, polypropylene, said dielectric being provided at least on one side thereof with a thin layer of a material which contains in the molecule at least 10 percent of an oxidation product required for the complete conversion thereof to stable oxidation products, said thin layer of material being selected from a class consisting of cellulose acetate, ethylcellulose, polytetrafluoroethylene, polyethyleneterephthalate, ethylenecellulose, nitrocellulose, acetabutyrate, and a metal coating disposed on said layers.

8. A regenerative capacitor according to claim 7, wherein the thickness of the dielectric layer amounts to less than 6 microns.

9. A regenerative capacitor according to claim 7, wherein the thickness of said thin layer amounts to 1 micron or less.

10. A regenerative capacitor according to claim 7, wherein the thickness of said dielectric layer amounts to less than 6 microns and wherein the thickness of said thin layer amounts to 1 micron or less.

References Cited by the Examiner

UNITED STATES PATENTS

| 1,906,691 | 5/1933 | Lilienfeld | 317—230 |
| 2,005,279 | 6/1935 | Van Geel | 317—233 |
| 2,593,829 | 4/1952 | Arledter | 317—258 |
| 2,740,732 | 4/1956 | Peck | 317—258 |
| 2,741,730 | 4/1956 | Maylandt | 317—258 |
| 2,749,490 | 6/1956 | Robinson | 317—258 |
| 2,864,982 | 12/1958 | Ruscetta | 317—258 |
| 2,950,266 | 8/1960 | Goldblum. | |

FOREIGN PATENTS

| 705,353 | 3/1954 | Great Britain. |
| 801,402 | 9/1958 | Great Britain. |
| 803,132 | 10/1958 | Great Britain. |

JOHN F. BURNS, *Primary Examiner.*

SAMUEL BERNSTEIN, JOHN P. WILDMAN,
*Examiners.*